United States Patent [19]

Funderburg et al.

[11] 4,325,571
[45] Apr. 20, 1982

[54] TUBE UNION AND METHOD FOR FORMING A JOINT BETWEEN ADJACENT END PORTIONS OF MALLEABLE TUBING

[76] Inventors: John E. Funderburg, 36712 Cloverleaf; Franklin H. Stafford, 12334 Gabor Way, both of Madera, Calif. 93637; Donald R. Funderburg, 220 S. Madera Ave.- No. 18, Kerman, Calif. 93630

[21] Appl. No.: 154,617

[22] Filed: May 30, 1980

[51] Int. Cl.³ .............................................. F16L 13/14
[52] U.S. Cl. ...................................... 285/177; 29/508; 29/520; 285/382.2; 285/382.4
[58] Field of Search ............... 285/382.4, 382.1, 382.2, 285/382.5, 177; 29/508, 520

[56] References Cited

U.S. PATENT DOCUMENTS

| | | | |
|---|---|---|---|
| 2,073,338 | 3/1937 | Durkee | 285/382.2 X |
| 2,805,591 | 9/1957 | Widmer | 29/520 X |
| 3,124,874 | 3/1964 | Woolley | 285/382.2 X |
| 3,378,282 | 4/1968 | Demler, Sr. | 29/508 X |
| 3,827,727 | 8/1974 | Moebius | 285/382.2 X |
| 3,956,815 | 5/1976 | Capper et al. | 285/382.2 X |
| 4,026,006 | 5/1977 | Moebius | 29/520 X |
| 4,061,367 | 12/1977 | Moebius | 285/382.2 |

FOREIGN PATENT DOCUMENTS 1141347  1/1969  United Kingdom ............. 285/382.1

Primary Examiner—Thomas F. Callaghan
Attorney, Agent, or Firm—Huebner & Worrel

[57] ABSTRACT

A tube union for forming a joint between adjacent lengths of malleable tubing formed by a pair of push-rings, each push-ring of the pair being the mirror image of the other and disposed in an opposed abutting engagement in a common plane of abutment normal to the axes of the push-ring collectively defining a sleeve-expansion chamber characterized by annular cross sections and tapering in opposite directions from a major diameter in the plane of abutment to a minor diameter in planes uniformly spaced from the sides of a plane of abutment, a malleable sleeve having its mid-portion radially expanded into engaged relationship with the adjacent surfaces of the chamber and further characterized by an internal, tube-coupling cavity substantially conforming to the shape of the sleeve-expansion member, a pair of end portions of lengths of malleable tubing oppositely inserted into the sleeve, each of the end portions being radially expanded into engaged relation with the adjacent surface of the tube-coupling cavity and a crushed O-ring disposed between the adjacent end surfaces of the tubing for forming a fluid-tight seal within the sleeve.

5 Claims, 7 Drawing Figures

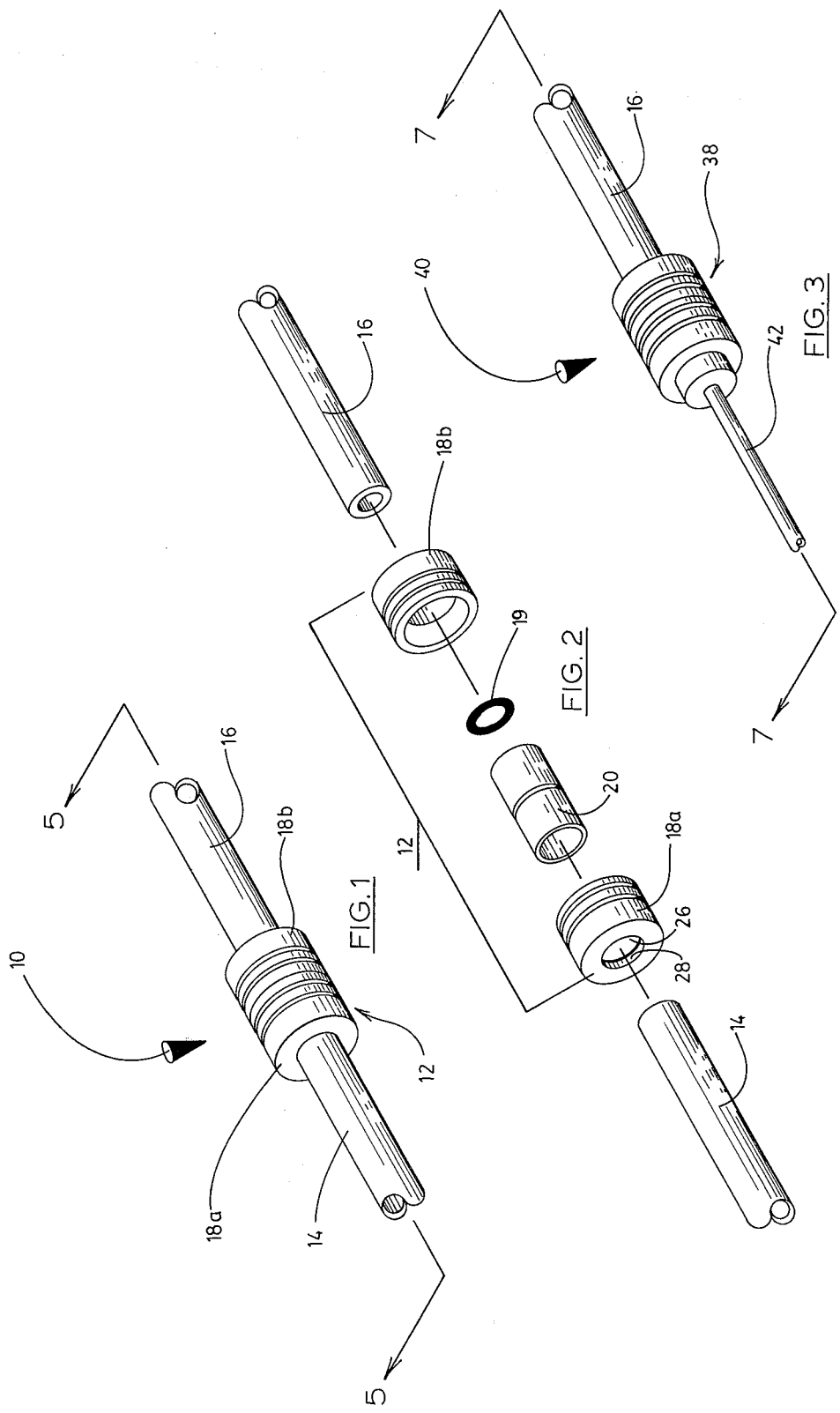

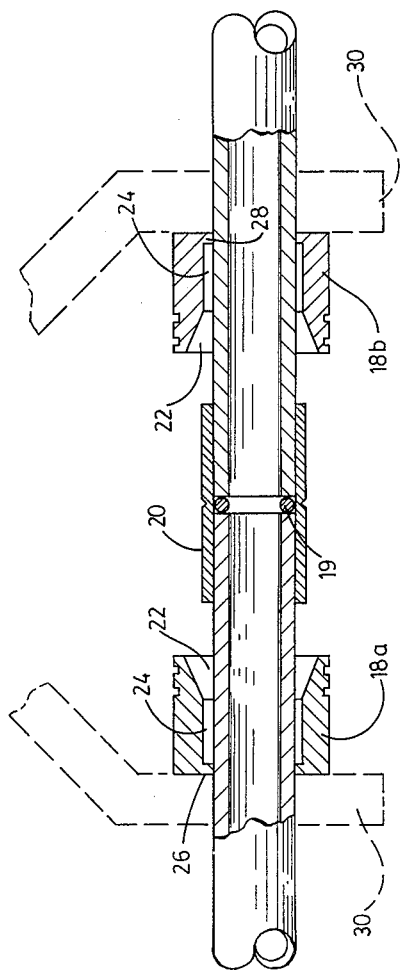
FIG. 4
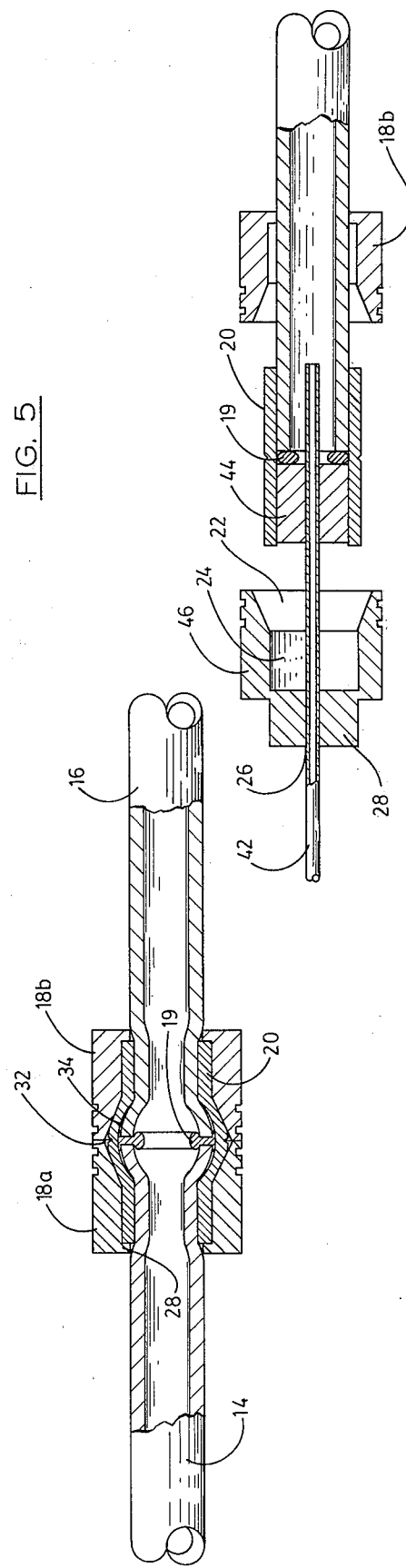
FIG. 5
FIG. 6
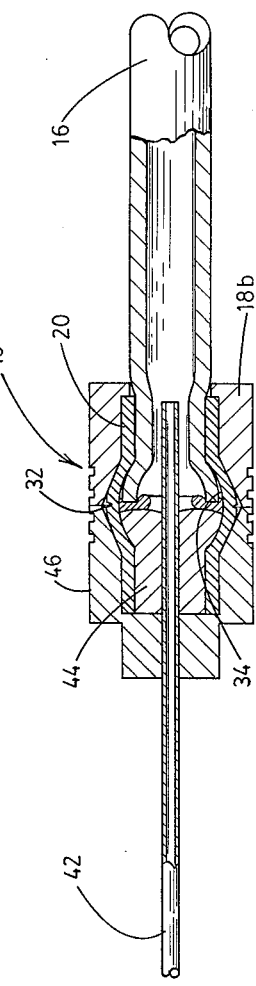
FIG. 7

TUBE UNION AND METHOD FOR FORMING A JOINT BETWEEN ADJACENT END PORTIONS OF MALLEABLE TUBING

BACKGROUND OF THE INVENTION

The invention generally relates to the art of forming joints between lengths of so-called rigid tubing, and more particularly to an improved union, and method of employing the union, for forming an improved joint between lengths of malleable tubing.

As can be fully appreciated by those familiar with problems encountered in coupling lengths of tubing, formed of malleable stock, such as copper and the like, there currently exists a need for improved unions which facilitate a rapid and economic formation of hermetically sealed joints capable of withstanding working pressures of magnitude such as those often found in the refrigeration process. It is to be understood that the term "malleable tubing", as herein employed, refers to malleable, ductile tubing of a type commonly employed in the refrigeration industry.

Heretofore, numerous attempts have been made to meet existing needs with varying degrees of success. Presently, the applicants are aware of the following U.S. Letters Patents: Nos.

| | | |
|---|---|---|
| 3,124,874 | Woolley | Mar. 17, 1964 |
| 3,149,860 | Hallesy | Sept. 22, 1964 |
| 3,149,861 | Larsson | Sept. 22, 1964 |
| 3,375,026 | Szohatzky | Mar. 26, 1968 |
| 3,378,282 | Demler | Apr. 16, 1968 |
| 3,429,587 | Kish | Feb. 25, 1969 |
| 3,466,066 | Dawson | Sept. 9, 1969 |
| 3,467,414 | Downing | Sept. 16, 1969 |
| 3,498,648 | Hallesy | Mar. 3, 1970 |
| 3,528,689 | Roe | Sept. 15, 1970 |
| 3,827,727 | Moebius | Aug. 6, 1974 |
| 3,893,720 | Moebius | July 8, 1975 |
| 4,026,006 | Moebius | May 31, 1977 |
| 4,061,367 | Moebius | Dec. 6, 1977 |

It is believed that the patents containing the most pertinent teachings are the patents to Moebius, Nos. 3,827,727; 4,026,006; and 4,061,367. While the patentee Moebius apparently has attempted to solve the same, or at least similar problems successfully solved by the applicants, it is noted that the patents do not suggest the structure which embodies the invention hereinafter disclosed and claimed. This distinction is believed to be significant since the patentee necessarily, in each of his patents, will lose the capability of maintaining an hermetic seal in the event a good metal-to-metal contact is not established or is lost for the joint.

It is, therefore, the general purpose of the instant invention to provide an improved union and method of employing the union for forming a fluid-tight joint between lengths of malleable tubing.

OBJECTS AND SUMMARY OF THE INVENTION

It is an object of the instant invention to provide an improved union for forming a joint between adjacent end portions of lengths of malleable tubing.

It is another object to provide a union forming a reliable fluid-tight between adjacent lengths of malleable tubing.

It is another object to provide a method for forming a reliable, rapidly assembled joint in coupling adjacent, coaxially aligned end portions of lengths of malleable tubing.

These and other objects and advantages are achieved through the use of a tube union comprising a cylindrical, malleable sleeve for telescopically receiving adjacent end portions of malleable tubing, inserted therein in a mutually opposed relationship, a resilient O-ring shaped and dimensioned to be received concentrically within the sleeve between the adjacent end surfaces of the lengths of tubing, and a pair or rigid, axially displaceable push rings for upsetting the tubing and sleeve; each push ring of the pair being provided with an axial bore characterized by an endwardly tapering frusto-conical first end section, a cylindrical mid-section and an annular second end section, the largest diameter of said first end section of the bore being substantially greater than the outside diameter of the sleeve, the smallest diameter of said first end section of the bore being slightly less than the outside diameter of the sleeve, the inside diameter of said mid-section of the bore being equal to the smallest diameter of the first end section and greater than the inside diameter of the second end section, whereby as the push rings of the pair are forceably displaced axially along said sleeve into opposed contiguous relation the adjacent end portions of the lengths of tubing and the sleeve are radially expanded into an interlocked relationship within the now contiguously related first end sections of the pair of push rings, as will become more readily apparent by reference to the following description in claims in light of the accompanying drawings.

DESCRIPTION OF THE DRAWINGS

FIG. 1 is a perspective view of the unique joint formed employing a tube union which embodies the principles of the instant invention.

FIG. 2 is a perspective, exploded view of the union.

FIG. 3 is a perspective view of a modified joint formed employing a modified tube union which also embodies the principles of the instant invention.

FIG. 4 is a cross-sectional view depicting a step in forming the joint shown in FIG. 1.

FIG. 5 is a cross-sectional view taken generally along lines 5—5 of FIG. 1.

FIG. 6 is a view similar to that of FIG. 4, depicting a step in forming the joint shown in FIG. 3.

FIG. 7 is a cross-sectional view taken generally along lines 7—7 of FIG. 3.

DESCRIPTION OF A FIRST PREFERRED EMBODIMENT

Referring now to FIG. 1, therein is illustrated a joint, generally designated 10, which embodies the principles of the instant invention.

The joint 10 is formed through the use of a union 12 and serves to connect lengths of malleable tubing 14 and 16 in a fluid-tight relationship. It is noted that while the lengths of tubing 14 and 16 subsequently are referred to as "rigid" tubing, such reference is made in order to distinguish the tubing from so-called "flex" tubing. In practice, the lengths of tubing 14 and 16 serve to conduct fluids maintained under pressure and comprise lengths of copper tubing stock which are both malleable and ductile and therefore are subject to permanent deformation.

Turning for a moment to FIG. 2, it can be seen that the union 12 includes a pair of push rings designated 18*a* and 18*b*, an O-ring 19, and a sleeve 20. It is to be understood that the push rings 18a and 18b, as shown in FIGS. 1 and 2, are of a common design, are similarly dimensioned and cooperatively perform a common function.

It also is important to note that each of the push rings 18a and 18b includes an axial bore, not designated, which includes a first end section designated 22, a mid-section 24, and a second end section defined by the lip 28 and designated 26. The first end section 22 is of a shape conforming to that of an endwardly tapered frustum of a cone, the mid-section of the bore is of a cylindrical configuration while the second end section 26 is annular in its shape.

It is important here to note that the first end sections 22, for the push rings 18a and 18b, initially are disposed in coaxial alignment and are arranged in a mirror imaging relationship on adjacent end portions of the lengths of tubing 14 and 16. It also is important to note that the major, or greater diameter of the first end section 22 of the bore is substantially greater than the outside diameter of the sleeve 20 while the minor, or smaller diameter of the first end section 22 is slightly less than the outside diameter of the sleeve. The minor diameters of the push rings are such that the diameter of the sleeve 20 must be reduced in order for the sleeve and push rings to assume a telescopically mated relationship. Further, the inside diameters of the mid-sections 24 of the bores of the push rings are substantially equal to the minor diameters of the first end sections 22 and substantially greater than the inside diameters of the second end sections 26. Finally, the inside diameters of the second end sections 26 are substantially equal to the outside diameters of the lengths of tubing 14 and 16. As shown, the axial length of the sleeve 20 is slightly greater than the combined lengths of the sections 22 and 24 for the push rings 18a and 18b.

Consequently, it should now be apparent that upon the push rings 18a and 18b being forced into abutting engagement the sleeve 20 will rapidly be constricted near each of its opposite ends and radially expanded along its central region. Also, the lips 28 serve to apply an axial force to opposite ends of the sleeve 20 for thereby assuring that a deformation of the sleeve as the push rings 18a and 18b are forced into an abutted relationship.

As a practical matter, a hydraulic jack having clamping arms 30, FIG. 4, is provided for forceably displacing the push rings 18a and 18b into coaxially aligned and abutted relationship for thus cooperatively forming the sleeve expansion chamber, designated 32, which accommodates radial expansion of the central region of the sleeve. It should be apparent that the frictional engagement of the constricted sleeve with the end portions of the tubing has a tendency to force the lengths of tubing to move axially toward one another, even though the O-ring is seated between the end surfaces thereof. Hence, an upsetting of the end portions of the lengths of tubing 14 and 16 occurs progressively and axially, simultaneously with the deformation of the sleeve 20, so that the extremities of the lengths of tubing are thus caused to flare outwardly into a tube coupling cavity, designated 34, formed integrally of the sleeve 20 as it is deformed. An interlocked, fluid-tight, metal-to-metal seal is thereby established between the lengths of tubing and the sleeve as the sleeve 20 is interlocked in sealed, metal-to-metal engaged relation with the push rings 18a and 18b. Of course, the O-ring 19 is crushed between the opposed surfaces of the end portions of the lengths of tubing for assuring that a fluid-tight seal is established between the adjacent surfaces of the tubing 14 and 16 in the event the metal-to-metal engagement of the tubing, sleeve and push rings fails to form a subsequently loses its fluid-tight integrity. Consequently, the criticality of establishing and maintaining a fluid-tight seal between the metal-to-metal contacting surfaces is greatly reduced.

As a practical matter, the metal-to-metal frictional engagement of the push rings 18a and 18b with the external surfaces of the sleeve 20 is deemed sufficient to preclude axial displacement of the sleeve along the tubing. Moreover, since the tubing is expanded within the cavity 34 formed annularly within the sleeve 20, and the sleeve 20 is expanded radially into the annular cavity 32 formed by the mated end sections 22 of the bore for the push rings, a residual continuous, outwardly applied force necessarily exists within the joint 10. Consequently, there is substantially no likelihood that the push rings 18a and 18b will undergo reversed displacement, however, even should this occur, the integrity of the seal will not be lost due to the sealing effect of the O-ring 19 and the interlocked relationship of the extremities of the tubing within the annular cavity 34.

DESCRIPTION OF A SECOND PREFERRED EMBODIMENT

Turning for a moment to FIGS. 3, 6 and 7, therein is illustrated a modification of the joint 10, designated 38. The joint 38 is formed through a union 40 employed for coupling a length of malleable tubing 42 with the length of malleable tubing 16. As can be seen, the outside diameter of the length of tubing 42 is substantially less than the outside diameter for the length of tubing 16. As a practical matter, the length of tubing 42 may be employed as a capillary tube for "bleeding" purposes. Since the specific purposes for which the length of tubing 42 is employed, forms no part of the instant invention, a detailed description thereof is omitted in the interest of brevity. However, it is important to note that as shown in FIGS. 6 and 7, the length of tubing 42 is provided with a malleable collar 44 having an outside diameter substantially equal to the inside diameter of the sleeve 20. Where so desired, the collar 44 and the tube may be assembled during the assembling of the union, preparatory to completing the formation of the joint 38. In practice, the collar 44 is formed of lead and is readily upset as the sleeve 20 is upset in a manner similar to that hereinbefore described with respect to the upsetting effects of the push ring 18a as it acts on the end portion of the tubing 14.

Additionally, it is noted that the union 40 includes a modified push ring 46 similar to the push ring 18a, except that the lip 28 is substantially greater in mass and size than the lip 28 previously discussed. However, it is also important to note that the inside diameter of the lip 28 forming the annular section 26 of the axial bore for the push ring 46 is substantially equal to the outside diameter of the length of tubing 42.

In assembling the union 40, the length of tubing 42 is inserted axially through the end section 26 of the push ring 46, as well as through an axial bore, not designated, formed in the collar 44. The collar 44 is then inserted into one end of the sleeve 20, and thence into abutted relation with the O-ring 19.

With the parts of the union 40 thus partially assembled, the push rings 46 and 18b are inserted into the clamping arms 30, of the jack, not shown, and are axially forced into abutted relation, whereupon the collar 44 expands radially outwardly into the tube coupling cavity 34 as it is formed in the sleeve 20. The cavity 34 is formed as the sleeve 20 is expanded radially into the sleeve expansion cavity 32, collectively formed by the adjacently related first end sections 22 of the axial bore extended through the push rings 46 and 18b, in a manner similar to that hereinbefore described. Thus the joint 38 is formed.

With the joints 10 and/or 38 formed in the manner hereinbefore described, the lengths of tubing 14 and 16, or alternatively, 42 and 16, are united in a fluid-tight relationship and mechanically secured against axial separation.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A tube union for forming a joint between adjacent end portions of lengths of malleable tubing comprising:
   A. a cylindrical sleeve formed from malleable stock for telescopically receiving adjacent end portions of lengths of malleable tubing in a mutually opposed relationship, the inside diameter of said sleeve being substantially equal to the outside diameter of the end portions of said lengths of tubing;
   B. a resilient O-ring so shaped and dimensioned as to be adapted to be received concentrically within said sleeve in interposed relation with the end surfaces of said lengths of tubing; and
   C. a pair of rigid push rings, each push ring of said pair having an axial bore characterized by an inwardly tapering frusto-conical first end section, a cylindrical midsection, an annular second end section, the largest diameter of said first end section being substantially greater than the outside diameter of said sleeve, the smallest diameter of said first end section being slightly less than the outside diameter of said sleeve, the inside diameter of said mid-section being equal to the smallest diameter of said first end section, whereby the push-rings of said pair are adapted to be forceably displaced axially along said sleeve into opposed contiguous relation for diametrically expanding the adjacent end portions of said lengths of tubing and said sleeve into an interlocked relationship within the contiguously related first end sections of the push rings of said pair.

2. The union as defined in claim 1 wherein the inside diameters of the second end sections of said pair of push rings are substantially equal to the outside diameter of said lengths of tubing.

3. A union as defined in claim 1 or 2 wherein the end portion of one length of malleable tubing of said pair includes a concentrically related malleable collar.

4. A tube union forming a joint between adjacent lengths of malleable tubing comprising:
   A. a pair of push rings, each push ring of the pair being a mirror image of the other and disposed in opposed abutting engagement in a common plane of abutment normal to the axes of the push rings collectively defining a sleeve-expansion chamber characterized by annular cross sections and tapering in opposite directions from a major diameter in the plane of abutment to a minor diameter in planes uniformly spaced from the opposite sides of said plane of abutment;
   B. a malleable sleeve having a mid-portion disposed in said chamber and radially expanded into an engaged relationship with the adjacent surface thereof having an internal, tube coupling cavity substantially conforming to the shape of the sleeve-expansion chamber;
   C. a pair of end portions of lengths of malleable tubing oppositely inserted into said sleeve, each of said end portions being radially expanded into engaged relation with the adjacent surface of the tube coupling cavity; and
   D. means including an O-ring disposed within said sleeve for establishing a fluid-tight seal between the end portions of said lengths of malleable tubing.

5. A tube union as defined in claim 4 wherein one end portion of said pair of end portions of malleable tubing includes an externally related malleable collar received by said sleeve.

* * * * *

UNITED STATES PATENT AND TRADEMARK OFFICE
CERTIFICATE OF CORRECTION

PATENT NO. : 4,325,571
DATED : April 20, 1982
INVENTOR(S) : John E. Funderburg, Franklin H. Stafford, and Donald R. Funderburg It is certified that error appears in the above-identified patent and that said Letters Patent are hereby corrected as shown below:

Title page, "ABSTRACT", line 15, after

"sleeve-expansion" delete "member"

and substitute ---chamber---; and

Column 4, line 4, after "form" delete "a" and substitute ---or---.

Signed and Sealed this

Twenty-second Day of June 1982

[SEAL]

Attest:

GERALD J. MOSSINGHOFF

*Attesting Officer*   *Commissioner of Patents and Trademarks*